(12) United States Patent
Laufer (10) Patent No.: US 9,593,646 B2
(45) Date of Patent: Mar. 14, 2017

(54) EXHAUST-GAS DISTRIBUTOR (71) Applicant: Daimler AG, Stuttgart (DE)

(72) Inventor: Thomas Laufer, Elhofen (DE)

(73) Assignee: Daimler AG, Stuttgart (DE)

( * ) Notice: Subject to any disclaimer, the term of this patent is extended or adjusted under 35 U.S.C. 154(b) by 84 days.

(21) Appl. No.: 14/380,451

(22) PCT Filed: Jan. 12, 2013

(86) PCT No.: PCT/EP2013/000076
§ 371 (c)(1),
(2) Date: Aug. 22, 2014

(87) PCT Pub. No.: WO2013/124023
PCT Pub. Date: Aug. 29, 2013

(65) Prior Publication Data
US 2015/0020525 A1   Jan. 22, 2015

(30) Foreign Application Priority Data
Feb. 25, 2012   (DE) .................. 10 2012 004 009

(51) Int. Cl.
*F02B 33/44*    (2006.01)
*F02M 25/07*    (2006.01)
(Continued)

(52) U.S. Cl.
CPC ............ *F02M 25/07* (2013.01); *F01N 13/08* (2013.01); *F01N 13/105* (2013.01); *F02B 37/00* (2013.01);
(Continued)

(58) Field of Classification Search
CPC ............. F02M 25/07; F02M 25/0707; F02M 25/0712; F02M 25/0719; F02B 37/18;
(Continued)

(56) References Cited

U.S. PATENT DOCUMENTS 1,848,048 A * 3/1932 Conrad .................. F01L 1/00
                                                    137/484
2,796,082 A * 6/1957 Green .................. F16K 1/221
                                                    137/630.15
(Continued)

FOREIGN PATENT DOCUMENTS

CN    101495743 A    7/2009
DE    102 22 917 A1  12/2003
(Continued)

OTHER PUBLICATIONS

Partial English translation of Japanese Office Action mailed Aug. 4, 2015 (Four (4) pages).
(Continued)

*Primary Examiner* — Thai Ba Trieu
(74) *Attorney, Agent, or Firm* — Crowell & Moring LLP (57) ABSTRACT

An exhaust gas distributor is disclosed. The distributor includes a distributor housing having a first exhaust gas path fluidically connecting a first inlet opening to a first outlet opening, a second exhaust gas path fluidically connecting a second inlet opening to a second outlet opening, and a third exhaust gas path fluidically connecting the second exhaust gas path to a third outlet opening, and an adjustable control element controlling the distribution of an exhaust gas flow from the second inlet opening to the second outlet opening and the third outlet opening. The control element in its end positions cooperates with stop contours. The control element is supported in a control housing that is manufactured separately from the distributor housing and which is installed in the distributor housing.

7 Claims, 5 Drawing Sheets

(51) Int. Cl.
*F16K 1/22* (2006.01)
*F16K 5/02* (2006.01)
*F01N 13/08* (2010.01)
*F01N 13/10* (2010.01)
*F02B 37/18* (2006.01)
*F02B 37/02* (2006.01)
*F02B 37/00* (2006.01)

(52) U.S. Cl.
CPC .............. *F02B 37/02* (2013.01); *F02B 37/18* (2013.01); *F02M 26/00* (2016.02); *F02M 26/05* (2016.02); *F02M 26/09* (2016.02); *F02M 26/16* (2016.02); *F16K 5/025* (2013.01); *F01N 2240/02* (2013.01); *F01N 2240/36* (2013.01); *Y02T 10/144* (2013.01)

(58) Field of Classification Search
CPC .......... F02B 37/02; F02B 37/00; F01N 13/08; F01N 2240/02; F01N 2240/36; Y02T 10/121; Y02T 10/144; F16K 27/003; F16K 11/074; F16K 11/0743; F16K 11/0746; F16K 11/0525; F16K 11/0856; F16K 5/0478; F16K 5/025; F16K 5/0464
USPC ....... 60/605.2; 123/568.11–568.12; 137/597, 137/625.46; 251/305–306, 314
See application file for complete search history.

(56) References Cited

U.S. PATENT DOCUMENTS

| | | | | | |
|---|---|---|---|---|---|
| 2,856,952 | A | * | 10/1958 | Stillwagon | F16K 11/0525 137/625.46 |
| 3,070,345 | A | * | 12/1962 | Knecht | F16K 1/223 251/305 |
| 3,971,414 | A | * | 7/1976 | Illing | F16K 1/222 251/305 |
| 4,480,815 | A | * | 11/1984 | Kreij | F16K 1/222 251/306 |
| 4,580,603 | A | * | 4/1986 | Schoen | F16K 11/0525 137/625.46 |
| 5,531,205 | A | * | 7/1996 | Cook | F02M 25/0793 251/306 |
| 6,003,554 | A | * | 12/1999 | Magdelyns | F16K 1/223 137/630.14 |
| 6,216,459 | B1 | * | 4/2001 | Daudel | F02M 25/0707 60/605.2 |
| 6,381,960 | B1 | * | 5/2002 | Mårdberg | F02M 25/0707 60/605.2 |
| 6,422,217 | B1 | | 7/2002 | Feucht et al. | |
| 6,698,717 | B1 | * | 3/2004 | Brookshire | F16K 1/222 251/305 |
| 7,051,527 | B2 | * | 5/2006 | Schmid | F02B 37/183 60/602 |
| 7,240,691 | B2 | * | 7/2007 | Bevan | F16K 1/222 251/305 |
| 8,127,796 | B2 | * | 3/2012 | Bonanno | F02M 25/0796 137/625.47 |
| 8,166,754 | B2 | * | 5/2012 | Frantzheld | F02M 25/0719 60/605.2 |
| 8,176,737 | B2 | * | 5/2012 | Pierpont | F02B 37/18 60/605.2 |
| 8,584,709 | B2 | | 11/2013 | Albert | |
| 2001/0017362 | A1 | * | 8/2001 | Schutz | F16K 27/0272 251/306 |
| 2002/0073978 | A1 | | 6/2002 | Feucht et al. | |
| 2004/0154674 | A1 | * | 8/2004 | Pieper | F16K 27/003 137/884 |
| 2005/0199226 | A1 | | 9/2005 | Watanuki et al. | |
| 2009/0120087 | A1 | | 5/2009 | Sumser et al. | |
| 2010/0037856 | A1 | * | 2/2010 | Dickerson | F02M 25/0707 60/605.2 |
| 2010/0108041 | A1 | | 5/2010 | Gruner et al. | |
| 2010/0148107 | A1 | * | 6/2010 | Keller-Staub | F16K 1/222 251/306 |

FOREIGN PATENT DOCUMENTS

| | | |
|---|---|---|
| DE | 10 2008 064 264 A1 | 6/2010 |
| JP | 2009-535547 A | 10/2009 |
| JP | 2009-541631 A | 11/2009 |
| JP | 2011-89522 A | 5/2011 |
| WO | WO 2007/147513 A1 | 12/2007 |

OTHER PUBLICATIONS

Corresponding International Search Report dated May 23, 2013 with English Translation (four (4) pages).
Chinese Office Action issued in Chinese counterpart application No. 201380010813.2 dated Jan. 26, 2016, with partial English translation (Eight (8) pages).
Japanese Office Action issued in Japanese counterpart application No. 2014-558026 dated Mar. 15, 2016, with partial English translation (Nine (9) pages).

* cited by examiner

EXHAUST-GAS DISTRIBUTOR

BACKGROUND AND SUMMARY OF THE INVENTION

Exemplary embodiments of the present invention relate to an exhaust gas distributor for an exhaust gas system of an internal combustion engine, in particular of a motor vehicle.

U.S. Pat. No. 6,422,217 B1 discloses an exhaust gas distributor with a distributor housing defining a first exhaust gas path, a second exhaust gas path, and a third exhaust gas path. The first exhaust gas path fluidically connects a first inlet opening, associated with at least one cylinder of the internal combustion engine, to a first outlet opening associated with a turbine of an exhaust gas turbocharger. The second exhaust gas path fluidically connects a second inlet opening, associated with at least one cylinder of the internal combustion engine, to a second outlet opening associated with the turbine. The third exhaust gas path fluidically connects the second exhaust gas path to a third outlet opening associated with an exhaust gas cooler. The known exhaust gas distributor also includes an adjustable control element for controlling the distribution of an exhaust gas flow, coming from the second inlet opening, over the second outlet opening and the third outlet opening. In the process, the control element in its end positions cooperates with stop contours, and is supported in a control housing manufactured separately from the distributor housing and which is installed in the distributor housing. In the known exhaust gas distributor, the control element is designed as an adjustable-stroke valve element, which in its end positions cooperates with valve seats that form the above-mentioned stop contours. One valve seat is formed on the control housing, while the other valve seat is formed on the distributor housing. To allow cooperation with the valve seat which is formed on the distributor housing, the valve element must be axially extended from the control housing.

The manufacture of an exhaust gas distributor of this type is fairly complicated, since comparatively narrow manufacturing tolerances must be observed so that the valve element may be properly adjusted between its end positions and may properly cooperate with the valve seat which is formed on the distributor housing.

German patent document DE 10 2008 064 264 A1 discloses another exhaust gas distributor that is used to supply the exhaust gases of the internal combustion engine to an exhaust gas turbocharger via dual ducts, whereby exhaust gas recirculation branches off from only one of the two ducts, while the other duct passes undisturbed to the turbine of the exhaust gas turbocharger.

Exemplary embodiments of the present invention provide an improved embodiment of an exhaust gas distributor of the type mentioned at the outset, which is characterized in particular by simplified, preferably inexpensive, manufacture.

In accordance with the present invention all stop contours, with which the control element cooperates in its end positions, are formed directly on the control housing. As a result, it is not necessary to form a stop contour on the distributor housing. Therefore, the distributor housing may be manufactured completely separately from the control element. Due to the integration of all stop contours into the control housing, it is necessary only to manufacture the control housing in combination with the control element, taking appropriate tolerances into account. However, this is achievable in a relatively simple manner, since the dimensions of the control housing are much smaller than those of the distributor housing. In addition, this means no additional expenditures for manufacturing the control housing, whether one stop contour or two stop contours must be provided in light of narrow manufacturing tolerances. The proposed design allows the control element together with the control housing to be configured as a completely pre-assembled unit which is also fully functional, since the control element is adjustable in the control housing between its end positions. In particular, the assembly unit thus formed may also be checked outside the distributor housing for proper functioning.

According to one advantageous embodiment, the control element and the control housing may thus be coordinated with one another in such a way that the control element in all its positions remains within the control housing. In other words, no interactions between the control element and the distributor housing are necessary for the functioning of the control element, which simplifies the separate manufacture of the control housing and the distributor housing.

In one advantageous embodiment, the control element may be situated so as to be pivotably adjustable about a pivot axis oriented transversely with respect to the flow direction of the exhaust gas in the control housing, the control housing being inserted into the distributor housing parallel to this pivot axis. As a result of this design, an assembly unit in which the pivotably adjustable control element remains within the control housing and all stop contours are formed directly on the control housing may be achieved in a particularly simple manner.

According to another advantageous embodiment, the distributor housing may have a receptacle having a receiving opening, situated on an outer side of the distributor housing, through which the control housing is inserted into the receptacle. The distributor housing may thus be prepared in a particularly simple manner for installation of the control housing. It is also noteworthy that, with regard to the distributor housing, it is necessary only to prepare for the accommodation of the control housing. Additional measures for achieving adjustability of the control element, such as coupling to a drive, may be omitted with regard to the distributor housing, which simplifies manufacture of the distributor housing.

According to one advantageous refinement, a flange of the control housing may close the receiving opening in the distributor housing and be fastened to the distributor housing. This type of flange is customarily composed of a circumferential collar that is closed in the peripheral direction, protrudes in the radial direction, and may be screwed to the distributor housing. Such a flange may cover radial play between the control housing and an inner wall of the receiving opening, and may provide sealing with respect to the outside. Manufacture of the exhaust gas distributor is simplified in this way.

In another refinement, the receiving opening may be situated on the same side of the distributor housing as the inlet openings. As a result, the accommodation of the control housing in the distributor housing is not provided externally, so that the exhaust gas distributor as a whole requires no more installation space than an integrated version in which the control element is directly situated or mounted in the distributor housing.

According to another advantageous embodiment, the control housing may be a monolithic cast part. Additionally or alternatively, it may be provided that the distributor housing is a monolithic cast part. Cast parts may be produced with comparatively high precision in large numbers, with relatively low manufacturing costs.

In another advantageous embodiment, the control element may be a valve, in particular a butterfly valve. These types of valve elements have consistently proven satisfactory in practice, and can be manufactured in a comparatively simple and cost-effective manner.

In another advantageous embodiment, it may be provided that in the installed state of the exhaust gas distributor the first inlet opening and the second inlet opening are situated directly on a cylinder head of an internal combustion engine. For example, for this purpose the distributor housing may have a first inlet flange encompassing the first inlet opening, and a second inlet flange encompassing the second inlet opening, the two inlet flanges being flange-mounted on the cylinder head of the internal combustion engine. The exhaust gas distributor thus forms an exhaust manifold or a central component of such an exhaust manifold. An "exhaust manifold" defines the inlet side of an exhaust gas system, and is directly connected to the cylinder head in order to accommodate the exhaust gases of the cylinders exiting at that location at outlet openings associated with the individual cylinders. The exhaust gas distributor presented here may now form such an exhaust manifold or a central component of the exhaust manifold, whereby a turbine of an exhaust gas turbocharger may be directly flange-mounted on the exhaust gas distributor.

According to another advantageous embodiment, each inlet opening in the exhaust gas distributor may be associated with exactly one cylinder of the internal combustion engine. If the exhaust gas distributor for an internal combustion engine is provided with more than two cylinders, the exhaust gas distributor or its distributor housing may have at least one connecting opening via which a manifold, which is fluidically connected to at least one further inlet opening that is associated with a further cylinder, is connectable to the distributor housing. Two such connecting openings are preferably formed on the distributor housing, so that two such manifolds are connectable to the distributor housing. As a whole, this results in an exhaust manifold which has the exhaust gas distributor presented here in a central position, and which includes two such manifolds which are laterally connected to the exhaust gas distributor.

According to another advantageous embodiment, the first outlet opening in the distributor housing may be associated with a first inlet of a dual-duct turbine of an exhaust gas turbocharger, while the second outlet opening in the distributor housing is associated with a second inlet of the dual-duct turbine. Due to this design, a first duct of the turbine is continuously supplied with exhaust gas via the first exhaust gas path, while a second duct of the turbine is acted on by an exhaust gas flow which fluctuates as a function of the desired exhaust gas recirculation. These types of dual-duct turbines are also referred to as twin scroll turbines.

Further important features and advantages of the invention result from the drawings, and the associated description of the figures with reference to the drawings.

It is understood that the features mentioned above and to be explained below may be used not only in the particular stated combination, but also in other combinations or alone without departing from the scope of the invention.

BRIEF DESCRIPTION OF THE DRAWING FIGURES

Preferred exemplary embodiments of the invention are illustrated in the drawings and explained in greater detail in the following description; identical, similar, or functionally equivalent components are denoted by the same reference numerals.

The figures show the following, in each case in a schematic manner.

DETAILED DESCRIPTION

According to FIGS. 1 through 5, an exhaust gas distributor 1 includes a distributor housing 2 and a control device 3. The exhaust gas distributor 1 is provided for an exhaust gas system, not shown here, in order to discharge the exhaust gases which occur during operation in an internal combustion engine, likewise not shown here. The internal combustion engine and the exhaust gas system are advantageously situated in a motor vehicle. However, stationary applications are also conceivable. The exhaust gas distributor 1 is preferably a central component of an exhaust manifold, so that the exhaust gas distributor 1 in particular is directly connected to a cylinder head of the internal combustion engine.

The distributor housing 2 has a first exhaust gas path 4 indicated by an arrow, a second exhaust gas path 5 indicated by an arrow, and a third exhaust gas path 6 indicated by an arrow. The first exhaust gas path 4 is used for fluidically connecting a first inlet opening 7 in the distributor housing 2 to a first outlet opening 8 in the distributor housing 2. The second exhaust gas path 5 is used for fluidically connecting a second inlet opening 9 in the distributor housing 2 to a second outlet opening 10 in the distributor housing 2. The third exhaust gas path 6 is used for fluidically connecting the second exhaust gas path 5 to an outlet opening 11 in the distributor housing 2, which is apparent in FIGS. 2 through 4.

The first inlet opening 7 is associated with exactly one cylinder of the internal combustion engine. The second inlet opening 9 is associated with exactly one (other) cylinder of the internal combustion engine. In the preferred example shown here, the distributor housing 2 includes a first inlet flange 12 surrounding the first inlet opening 7, and a second inlet flange 13 surrounding the second inlet opening 9. The distributor housing 2 may be directly fastened to the cylinder head of the internal combustion engine by means of the inlet flanges 12, 13. The first outlet opening 8 and the second outlet opening 10 are each associated with a turbine of an exhaust gas turbocharger, not shown here. This turbine is preferably a dual-duct turbine having a first inlet and a second inlet. The first outlet opening 8 is then connected to the first inlet of the turbine, while the second outlet opening 10 is connected to the second inlet of the turbine. In the example, the distributor housing 2 includes a turbine flange 14 by means of which the distributor housing 2 may be fastened to the turbine or to a housing of the turbine of the exhaust gas turbocharger. A fluidic connection to an exhaust gas cooler (which may also be referred to as an exhaust gas recirculation cooler), not shown here, may be established via the third outlet opening 11.

In the example shown here, the distributor housing 2 also includes a first connecting opening 15 and a second connecting opening 16. Via the first connecting opening 15, a first manifold (not shown here) may be connected to the distributor housing 2, which is fluidically connected to at least one further inlet opening that is associated with a further cylinder of the internal combustion engine. Additional cylinders may thus be integrated into the first exhaust gas path 4 via the first manifold and via the first connecting opening 15. At the second connecting opening 16 a second manifold, likewise not shown, may be connected to the distributor housing 2, which is fluidically connected to at least one further inlet opening that is associated with a further cylinder of the internal combustion engine. At least one additional cylinder may thus be connected to the second exhaust gas path 5 via the second manifold and via the second connecting opening 16.

Figure 1:
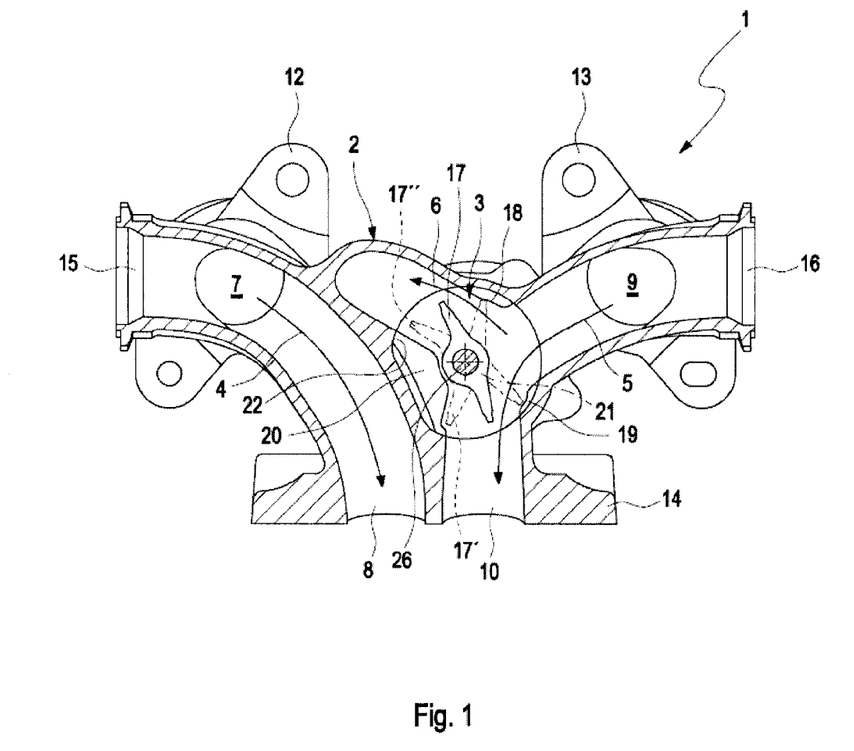
FIG. 1 shows a sectional illustration of an exhaust gas distributor in a front view.
Figure 2:
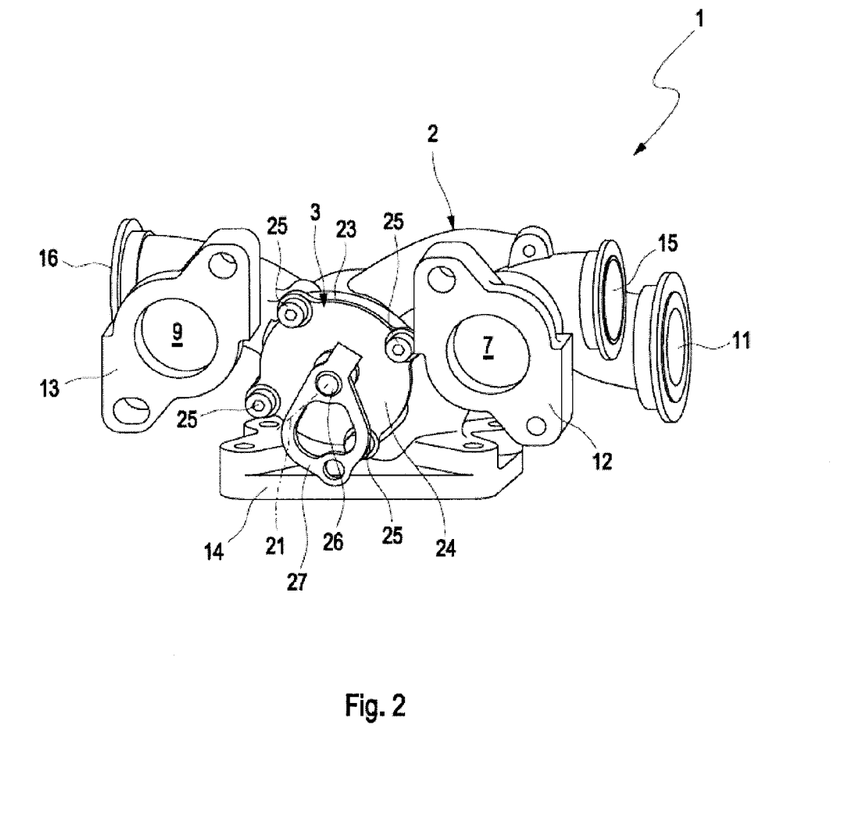
FIG. 2 shows an isometric view of the exhaust gas distributor in a rear view.

The control device 3 includes an adjustable control element 17, which is adjustable between two end positions for controlling a distribution of an exhaust gas flow, coming from the second inlet opening 9 or from the second connecting opening 16, over the second outlet opening 10 and over the third outlet opening 11. In FIGS. 1 and 3 through 5, the control element 17 is illustrated by a solid line in an intermediate position between the two end positions. In FIG. 1, the control element 17 is illustrated by a dashed line in a first end position and denoted by reference numeral 17', this first end position also being denoted by reference numeral 17' below. In addition, the control element 17 in FIG. 1 is likewise illustrated by a dashed line in a second end position and denoted by reference numeral 17"; this second end position may likewise be denoted by reference numeral 17" below. In the first end position 17', the control element 17 supplies the exhaust gas flow solely to the second outlet opening 10. In its second end position 17", the control element 17 supplies the exhaust gas flow solely to the third outlet opening 11. Between the two end positions 17' and 17", virtually any arbitrary intermediate positions are conceivable for the control element 17 to allow setting of any given exhaust gas recirculation rate, i.e., any given distribution of the exhaust gas flow, over the second outlet opening 10 and the third outlet opening 11.

Figure 5:
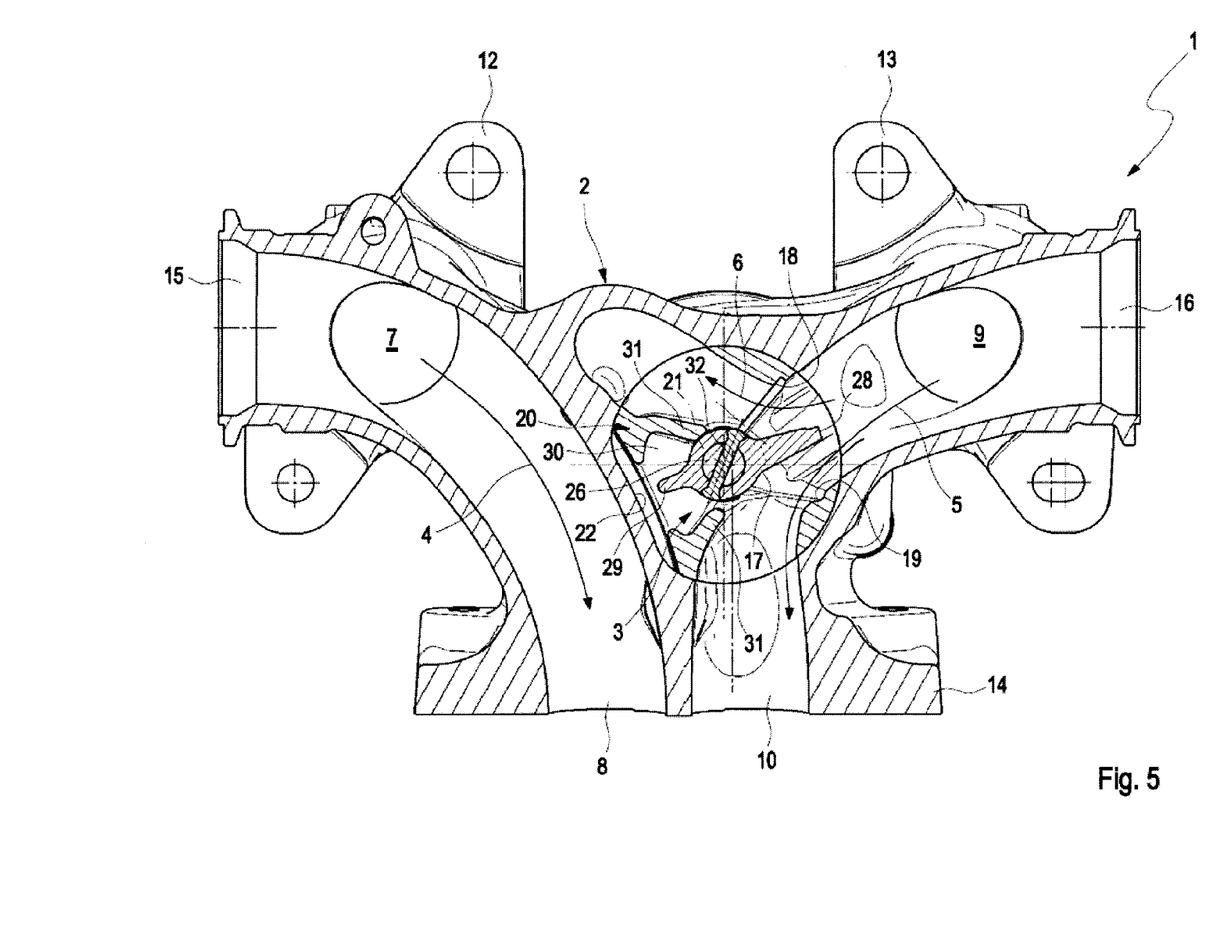
FIG. 5 shows a sectional view as in FIG. 1, but in another embodiment.

The same analogously applies for the embodiment according to FIG. 5, in which, however, the control element 17 is only illustrated by a solid line in the intermediate position.

In the end positions 17' and 17", the control element 17 cooperates with the stop contours 18, 19, respectively, a first stop contour 18 being associated with the first end position 17', and a second stop contour 19 being associated with the second end position 17".

The control device 3 also includes a control housing 20 in which the control element 17 is adjustably supported, and which is manufactured separately from the distributor housing 2. The control housing 20 is installed in the distributor housing 2. The above-mentioned stop contours 18, 19, which are used to delimit the end positions 17', 17", respectively, of the control element 17 are formed on the control housing 20. The control element 17 may thus remain within the control housing 20 in all of its positions, and at no time does it have to extend from the control housing 20. Any disadvantageous interaction with the distributor housing 2 may be avoided in this way.

In the preferred examples shown, the control element 17 is supported in the control housing 20 so as to be pivotably adjustable about a pivot axis 21. The pivot axis 21 extends transversely with respect to a flow direction of the exhaust gas in the control housing 20. The control housing 20 and the distributor housing 2 are now coordinated with one another in such a way that the control housing 20 may be inserted into the distributor housing 2 parallel to the pivot axis 21. For this purpose, the distributor housing 2 may advantageously be provided with a receptacle 22 whose inner contour has a shape that is complementary to the outer contour of the control housing 20. At an outer side of the distributor housing 2, the receptacle 22 has a receiving opening 23, indicated in FIGS. 2 through 4, through which the control housing 20 may be inserted into the receptacle 22, and thus, into the distributor housing 2. The control housing 20 includes a flange 24 integrally formed on the control housing 20. The flange 24 is dimensioned in such a way that in the installed state it closes the receiving opening 23. In addition, the control housing 20 may be fastened to the distributor housing 2 via the flange 24. Multiple screw connections 25 are provided in the example.

In the embodiment shown here, the receiving opening 23 is situated on the distributor housing 2 on the same side as the two inlet openings 7, 9. The distributor housing 2 may thus be installed, in particular directly on the engine block of the internal combustion engine, in a particularly space-saving manner. It is noteworthy that the control device 3 then does not protrude beyond the two inlet flanges 12, 13 in the installation direction.

The control housing 20 is advantageously a monolithic cast part, preferably made of gray cast iron or cast steel. The distributor housing 2 is preferably a monolithic cast part, preferably made of gray cast iron. In the example shown, the control element 17 is a valve, in particular a butterfly valve. This type of valve is characterized in particular by a small moment of inertia.

In the example, the control element 17 is connected in a rotationally fixed manner to a drive shaft 26 which extends coaxially with respect to the pivot axis 21 and which is rotatably supported on the control housing 20, and which at an outer side of the control housing 20 is connected in a rotationally fixed manner to a drive lever 27, which may advantageously be coupled to a drive, not shown here, for pivoting the control element 17.

Figure 3:
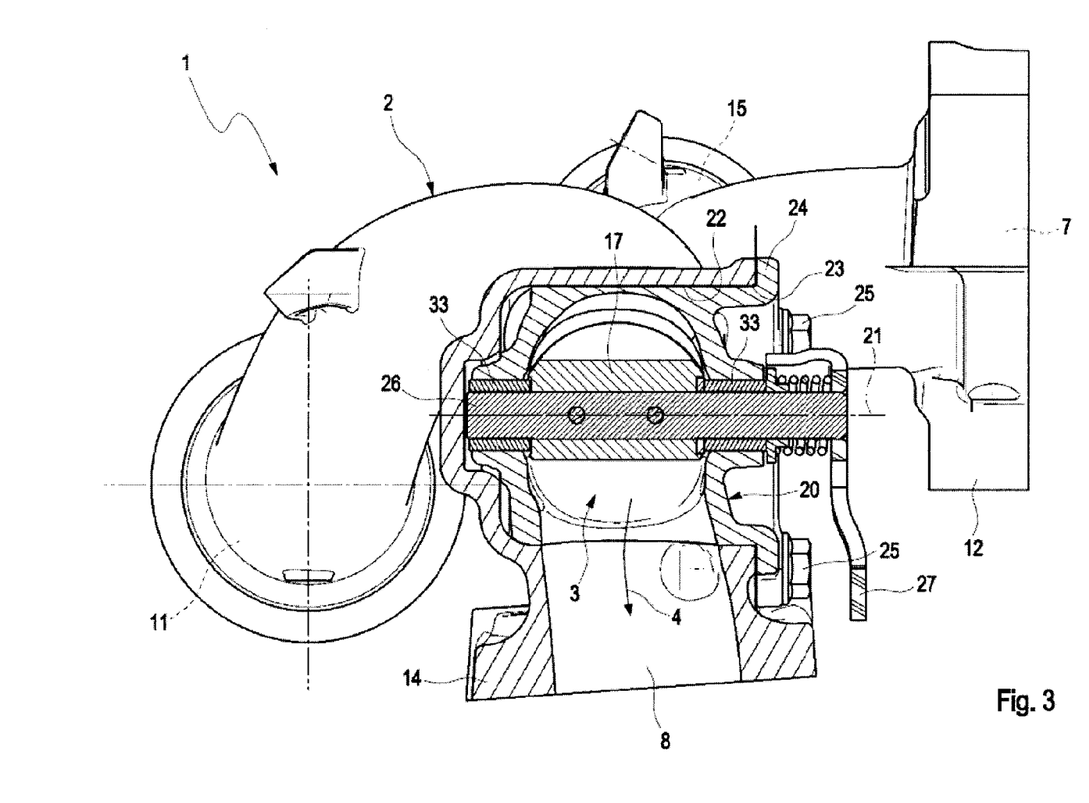
FIG. 3 shows a sectional illustration of the exhaust gas distributor perpendicular to the sectional view in FIG. 1.
Figure 4:
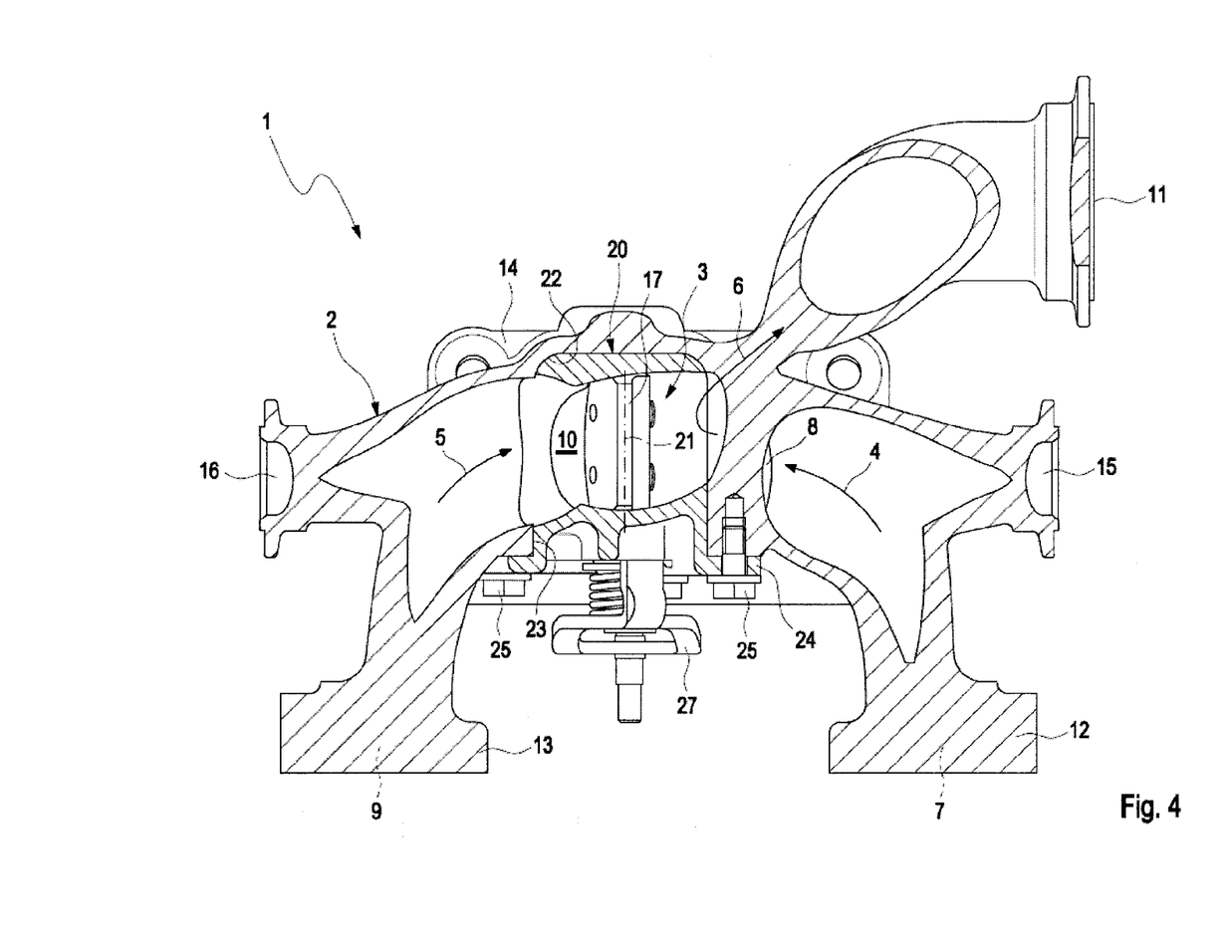
FIG. 4 shows another sectional view of the exhaust gas distributor perpendicular to the sectional views in FIGS. 1 and 3.

Whereas in the embodiment shown in FIGS. 1, 3, and 4 the control element 17 is configured as a symmetrical valve, which may also be referred to as a butterfly valve, FIG. 5 shows an embodiment in which the control element 17 is configured as an asymmetrical valve. In this asymmetrical configuration, the pivot axis 21 is positioned eccentrically in the control element 17. Accordingly, in this case the control element 17 has a larger valve section 28, and diametrically opposite thereto has a smaller valve section 29. The larger valve section 28 is used for controlling the exhaust gas flows, and in the end positions of the control element 17 cooperates with the stops 18, 19. In contrast, the shorter valve element 29 is situated in a chamber 30 in the control housing 20 which is largely decoupled from the gas paths 5, 6 by means of the walls 31. Accordingly, the control element 17 is exposed to no, or only reduced, flow forces in the area of its smaller valve section 29. Use may thus be made of the flow forces, at least in the end positions of the control element 17, to press the control element 17 against the respective stop 18, 19.

In the embodiment shown in FIG. 5, it is illustrated strictly by way of example that the control element 17 may be connected to the drive shaft 26 in a rotationally fixed manner by means of a splint or a rivet 32, for example.

According to FIG. 3, the drive shaft 26 may be supported on the control housing 20 by means of two bearings 33. The two bearings 33 are situated on both sides of the control element 17, and are each inserted into a wall of the control housing 20. In the example, the bearings are designed as radial sliding bearings.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An exhaust gas distributor for an exhaust gas system of a motor vehicle internal combustion engine, the exhaust gas distributor comprising:
   a distributor housing, which comprises
      a first exhaust gas path fluidically connecting a first inlet opening, associated with at least one cylinder of the internal combustion engine, to a first outlet opening associated with a turbine of an exhaust gas turbocharger,
      a second exhaust gas path fluidically connecting a second inlet opening, associated with at least one cylinder of the internal combustion engine, to a second outlet opening associated with the turbine, and
      a third exhaust gas path fluidically connecting the second exhaust gas path to a third outlet opening associated with an exhaust gas cooler,
   an adjustable control element configured to control distribution of an exhaust gas flow from the second inlet opening to the second outlet opening and the third outlet opening, wherein the adjustable control element is configured to cooperate with stop contours in end positions of the adjustable control element,
   wherein the adjustable control element is supported in a control housing, which is manufactured separately from the distributor housing and is installed in the distributor housing,
   wherein the stop contours are formed on the control housing, and the adjustable control element is a valve, and
   wherein the distributor housing has a receptacle with a receiving opening situated on an outer side of the distributor housing, wherein the receiving opening is configured for insertion of the control housing into the receptacle.

2. The exhaust gas distributor of claim 1, wherein a flange of the control housing is configured to close the receiving opening and is fastened to the distributor housing.

3. The exhaust gas distributor of claim 1, wherein the receiving opening is situated on a same side of the distributor housing as the first and second inlet openings.

4. The exhaust gas distributor of claim 1, wherein the adjustable control element is a butterfly valve.

5. The exhaust gas distributor of claim 1, wherein in an installed state, the first inlet opening and the second inlet opening are situated directly on a cylinder head of an internal combustion engine.

6. The exhaust gas distributor of claim 1, wherein each of the first and second inlet openings is associated with a respective cylinder.

7. The exhaust gas distributor of claim 1, wherein the first outlet opening is associated with a first inlet of a dual-duct turbine of an exhaust gas turbocharger, and the second outlet opening is associated with a second inlet of the dual-duct turbine.

* * * * *